(12) United States Patent
Kimoto

(10) Patent No.: US 8,428,116 B2
(45) Date of Patent: Apr. 23, 2013

(54) MOVING PICTURE ENCODING DEVICE, METHOD, PROGRAM, AND MOVING PICTURE DECODING DEVICE, METHOD, AND PROGRAM

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1474 days.

(21) Appl. No.: 11/576,801

(22) PCT Filed: Oct. 6, 2005

(86) PCT No.: PCT/JP2005/018568
§ 371 (c)(1),
(2), (4) Date: Apr. 5, 2007

(87) PCT Pub. No.: WO2006/038679
PCT Pub. Date: Apr. 13, 2006

(65) Prior Publication Data
US 2008/0031328 A1 Feb. 7, 2008

(30) Foreign Application Priority Data
Oct. 7, 2004 (JP) ................................. 2004-295334

(51) Int. Cl.
*H04B 1/66* (2006.01)
*H04N 1/413* (2006.01)
*H04N 7/12* (2006.01)

(52) U.S. Cl.
USPC ...................... 375/240; 358/426.13; 348/397

(58) Field of Classification Search .................. 375/240; 358/136, 426.13
See application file for complete search history.

(56) References Cited

U.S. PATENT DOCUMENTS

| | | | | |
|---|---|---|---|---|
| 5,173,773 A | * | 12/1992 | Ueda et al. ............... | 375/240.18 |
| 5,818,531 A | * | 10/1998 | Yamaguchi et al. ....... | 375/240.2 |
| 5,973,739 A | * | 10/1999 | Nilsson ...................... | 375/240.1 |

FOREIGN PATENT DOCUMENTS

| | | |
|---|---|---|
| JP | 3-66278 A | 3/1991 |
| JP | 4-177992 A | 6/1992 |
| JP | 6-78292 A | 3/1994 |
| JP | 6-209468 A | 7/1994 |
| JP | 7-107488 A | 4/1995 |
| JP | 9-172643 A | 6/1997 |
| JP | 10-224799 A | 8/1998 |
| JP | 10-257502 | 9/1998 |
| JP | 2001-320715 A | 11/2001 |
| WO | WO 93/20650 A1 | 10/1993 |

* cited by examiner

*Primary Examiner* — Sath V Perungavoor
*Assistant Examiner* — Xiaolan Xu
(74) *Attorney, Agent, or Firm* — Sughrue Mion, PLLC

(57) ABSTRACT

After an input image signal (2000) of a smaller resolution is encoded by an encoder (20), an input image signal (1000) of a greater resolution is subjected to motion compensation processing by a motion compensation unit (102) according to motion information (1998), thereby generating a prediction error signal (1001). Simultaneously with this, an enlarged decoded image (2003) obtained by enlarging the decoded image (2002) obtained by an encoder (20) is subjected to motion compensation processing by a motion compensation unit (103) according to the motion information (1998), thereby generating a prediction error signal (2005). By referencing the prediction error signal (2005), the prediction error signal (1001) is subjected to conversion encoding, quantization, and entropy encoding.

9 Claims, 6 Drawing Sheets

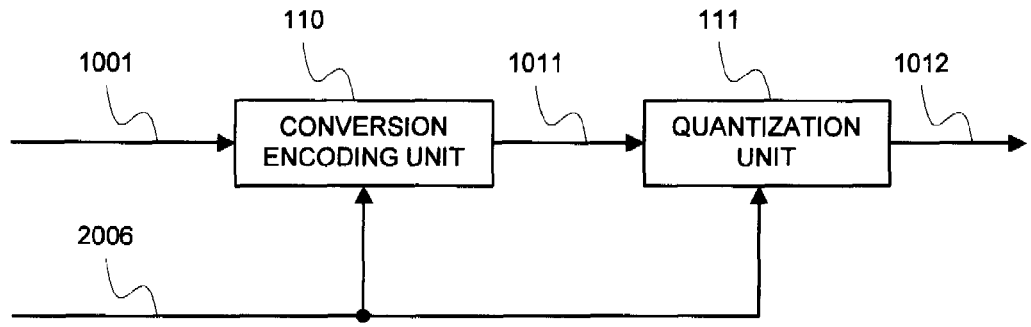
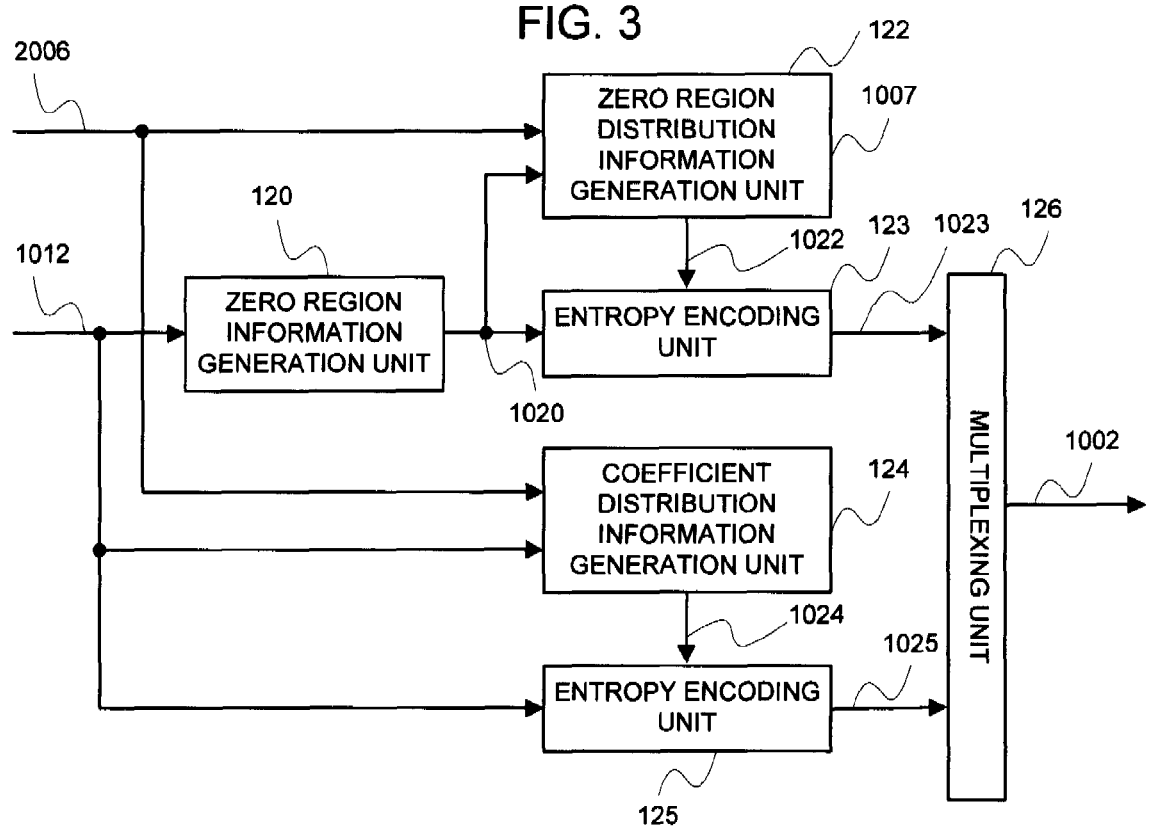
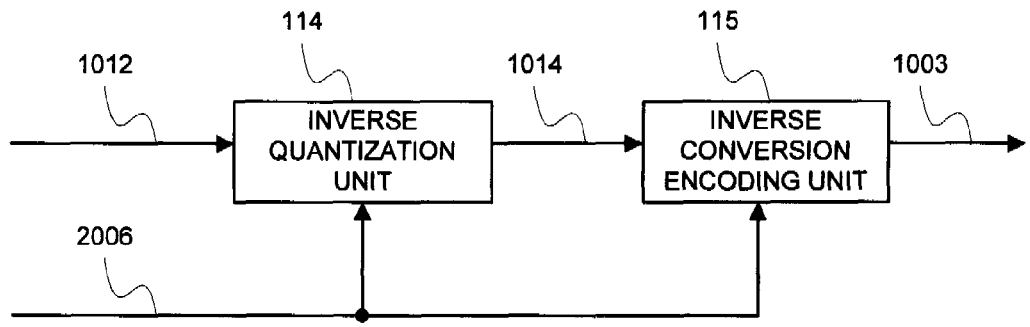

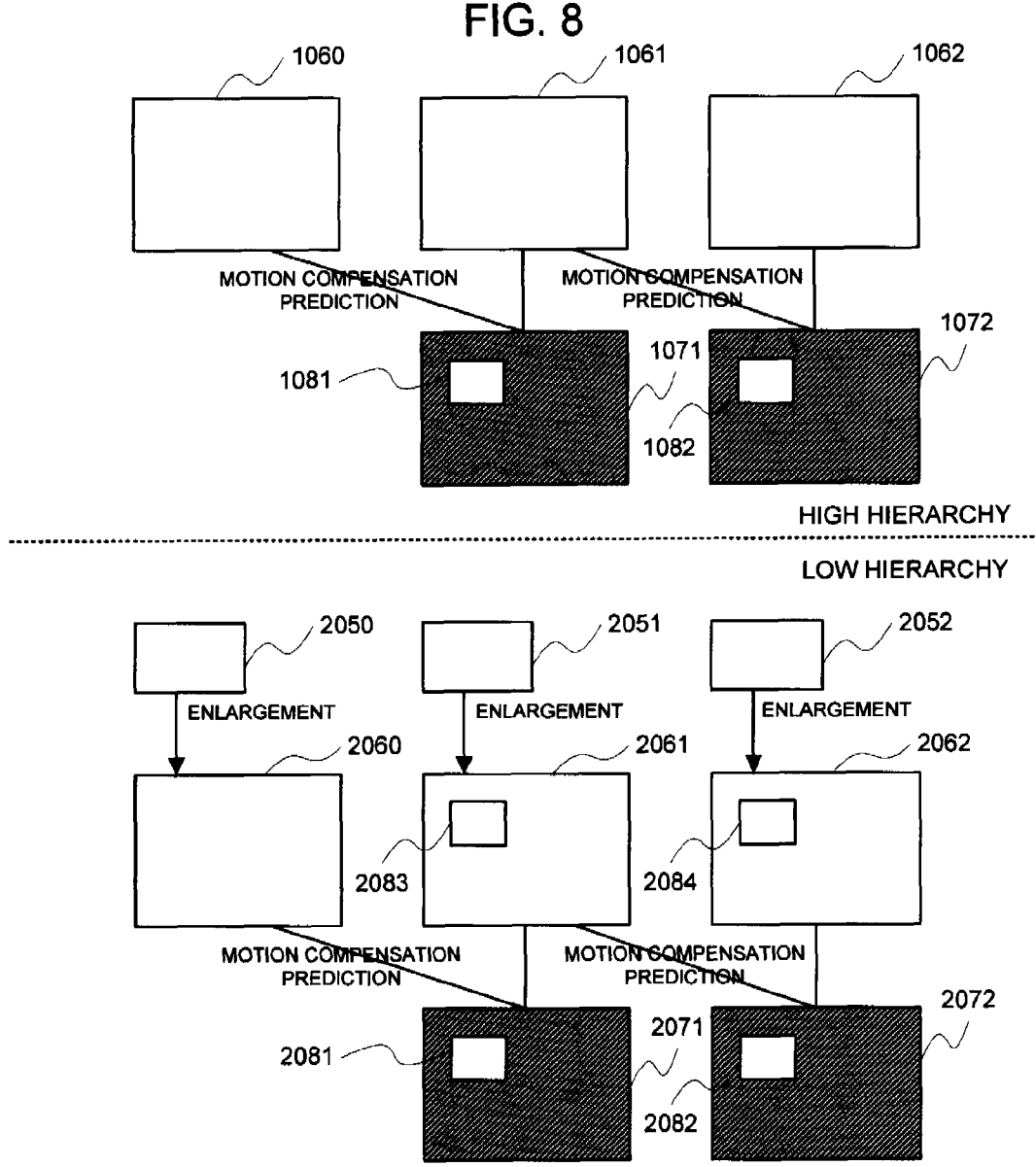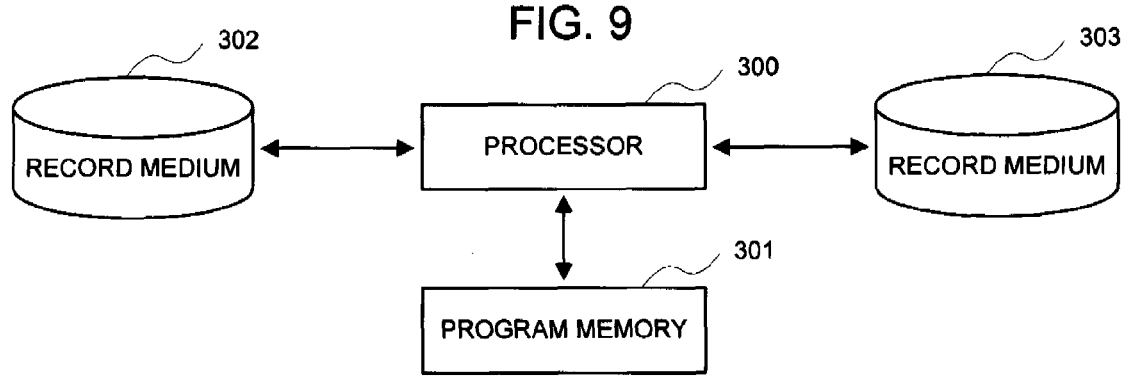

MOVING PICTURE ENCODING DEVICE, METHOD, PROGRAM, AND MOVING PICTURE DECODING DEVICE, METHOD, AND PROGRAM

APPLICABLE FIELD IN THE INDUSTRY

The present invention relates to a moving picture encoding device, method, and program for encoding a moving picture to generate encoding data, and a moving picture decoding device, method, and program for decoding the encoding data, and more particularly to a moving picture encoding device, method, and program that are involved in scalable encoding for hierarchically encoding moving pictures each having a different resolution, and a moving picture decoding device, method, and program for the same.

BACKGROUND ART

The so-called scalable encoding signifies the encoding technology such that from single encoding data, one part thereof is cut out, and its cut-out encoding data is decoded, thereby enabling decoded images each having a different resolution, frame rate and bit rate to be generated. The scalable encoding allows a processing cost of the encoding, a accumulating cost, and a cost for the processing prior to delivery to be reduced more remarkably than preparing the encoding data independently for terminals each having a different reproduction environment, and transmission environments. Also in an MPEG, being an encoding technology of the International Standard, the scalable encoding technology has been established simultaneously with the technology of encoding the single moving picture. And, the technology of performing the encoding with high efficiency also has been proposed in this scalable encoding technology (for example, Patent document 1).

FIG. 7 is a block diagram signifying a configuration of the moving picture encoding device having the scalable encoding technology of performing the encoding with high efficiency, being the foregoing prior art. An operation of the moving picture encoding device having the prior art will be explained by employing FIG. 7.

The moving picture encoding device shown in FIG. 7 encodes two input image signals 1000 and 2000 each having a different resolution.

An encoder 20 encodes the input image signal 2000 of a smaller resolution (hereinafter, referred to as a low hierarchy), and generates texture information encoding data 2001 and motion information encoding data 2999. Simultaneously therewith, the encoder 20 outputs a decoded image signal 2002 that is obtained by decoding these items of encoding data. A filter 199 enlarges the decoded image signal 2002 so that it has a resolution identical to that of the input image signal 1000 of a greater resolution (hereinafter, referred to as a high hierarchy), and outputs an enlarged decoded image signal 2003. An encoder 11 makes a reference to the enlarged decoded image signal 2003 to encode the input image signal 1000, and generates texture information encoding data 1002 and motion information encoding data 1999.

The encoder 20 is an encoder for encoding the image signal of a single resolution that is used conventionally, and for example, the moving picture encoder that is specified by the MPEG is employed for it.

The encoder 11 is comprised of a frame memory 100, a motion estimation unit 101, a motion compensation unit 102, a filter 104, a texture conversion unit 105, a texture encoding unit 112, a texture inverse conversion unit 106, and a motion information encoding unit 107. Hereinafter, a configuration and an operation of the encoder 11 will be explained in details.

The frame memory 100 having the decoded image signal filed that is obtained by, after having encoded the input image signal 1000 input in the past, decoding it. The motion estimation unit 101 makes a reference to a decoded image signal 1005 filed in the frame memory 100 and the enlarged decoded image signal 2003, thereby to generate motion information 1998 signifying how each region within the input image signal 1000 behaves for these reference signals. The motion compensation unit 102 subjects the decoded image signal 1005 and the enlarged decoded image signal 2003 to motion compensation processing according to the motion information 1998, and generates a prediction signal 1007 of the input image signal 1000. Subtracting the prediction signal 1007 from the input image signal 1000 allows a prediction error signal 1001 to be generated. The texture conversion unit 105 subjects the prediction error signal 1001 to frequency conversion and quantization. The texture encoding unit 112 encodes quantization conversion coefficient information 1012 that the texture conversion unit 105 outputs to generate texture information encoding data 1002. The motion information encoding unit 107 encodes the motion information 1998 to generate motion information encoding data 1999. The texture inverse conversion unit 106 subjects the quantization conversion coefficient information 1012 to inverse quantization and frequency inverse conversion to output a decoding prediction error signal 1003. Adding the decoding prediction error signal 1003 and the prediction signal 1007 allows a decoded image signal 1004 to be generated. The decoded image signal 1004, which is filed into the frame memory 100, is employed as a reference signal of the motion compensation at the time of encoding the other frames of the input image signal 1000.

Making a reference to a decoding result of the low-hierarchy image signal in addition to the past frame already encoded in encoding the high-hierarchy image signal makes it possible to encode it more efficiently. For example, encoding a difference with the decoding result of the low-hierarchy image signal in the region that was obscured due to a shadow of a body in the past frame and has come out for the first time in the present frame makes it possible to encode the image signal with high efficiency than performing the motion compensation prediction having a correlativity in the temporal direction taken into consideration.

Patent document 1: JP-P2001-320715A

DISCLOSURE OF THE INVENTION

Problems to be Solved by the Invention

The encoding efficiency identical to that of the encoding technology of encoding the single image signal that is conventionally employed is required for the scalable encoding technology. In the scalable encoding, decoding the high-hierarchy image necessitates the low-hierarchy encoding data and the high-hierarchy encoding data. It is desirable that a sum of these data amounts is almost equal to the data amount at the time of independently having encoded the high-hierarchy image signal so that its image quality is made identical to that of the decoding result of the high hierarchy. In the prior art, in encoding the high-hierarchy image signal, encoding a difference with the decoding result of the low-hierarchy image signal allows the encoding efficiency to be enhanced.

However, satisfying the foregoing requirement necessitates enhancing the encoding efficiency all the more.

Thereupon, the present invention has been accomplished in consideration of the above-mentioned problems, and an object thereof is to provide a moving picture encoding system for performing the hierarchical encoding for the image signals each having a different resolution with high efficiency and a decoding system for the same.

Means to Solve the Problem

The first invention for solving the above-mentioned problem, which is a moving picture encoding device for, for a plurality of input image signals each having a different resolution, making a reference to an encoding result of one input image signal to encode the other input image signal, thereby to perform hierarchical encoding, is characterized in: including: first image encoding means for encoding a first input image signal, generating first encoding data, and generating a decoded image signal, being a decoding result of the first encoding data; a filter for enlarging the decoded image signal so that it has a resolution identical to that of a second input image signal, and generating an enlarged decoded image signal; second image encoding means for making a reference to the enlarged decoded image signal to encode the second input image signal, and generating second encoding data; and that the second image encoding means subjects the second input image signal to a motion compensation prediction to generate a second prediction error signal, subjects the enlarged decoded image signal to a motion compensation prediction identical to the motion compensation prediction, to which the second input image signal has been subjected, to generate a first prediction error signal, and makes a reference to the first prediction error signal to encode the second prediction error signal.

The second invention for solving the above-mentioned problem, which is a moving picture decoding device for, for encoding data of a plurality of input image signals each having a different resolution, making a reference to a decoding result of first encoding data to decode second encoding data, thereby to perform hierarchical decoding processing, is characterized in: including: first image decoding means for decoding the first encoding data to generate a first decoded image signal; a filter for enlarging the first decoded image signal to generate an enlarged decoded image signal; and second image decoding means for making a reference to the enlarged decoded image signal to decode the second encoding data, and generating a second decoded image signal; and making a reference to motion information indicating a motion between frames of the image signal that specifies motion compensation decoding processing in the second image decoding means, subjecting the enlarged decoded image signal to a motion compensation prediction to generate a first prediction error signal, and making a reference to the first prediction error signal to decode the second encoding data.

The third invention for solving the above-mentioned problem, which is a moving picture encoding method of, for a plurality of input image signals each having a different resolution, making a reference to an encoding result of one input image signal to encode the other input image signal, thereby to perform hierarchical encoding, is characterized in including the steps of: encoding a first input image signal, generating first encoding data, and generating a decoded image signal, being a decoding result of the first encoding data; enlarging the decoded image signal so that it has a resolution identical to that of a second input image signal, and generating an enlarged decoded image signal; and subjecting the second input image signal to a motion compensation prediction to generate a second prediction error signal, subjecting the enlarged decoded image signal to a motion compensation prediction identical to the motion compensation prediction, to which the second input image signal has been subjected, to generate a first prediction error signal, and making a reference to the first prediction error signal to encode the second prediction error signal.

The fourth invention for solving the above-mentioned problem, which is a moving picture decoding method of, for encoding data of a plurality of input image signals each having a different resolution, making a reference to an decoding result of first encoding data to decode second encoding data, thereby to perform hierarchical decoding processing, is characterized in including the steps of: decoding the first encoding data to generate a first decoded image signal; enlarging the first decoded image signal to generate an enlarged decoded image signal; and making a reference to motion information indicating a motion between frames of the image signal that specifies motion compensation decoding processing, subjecting the enlarged decoded image signal to a motion compensation prediction to generate a first prediction error signal, making a reference to the first prediction error signal to decode the second encoding data, and generating a second decoded image signal.

The fifth invention for solving the above-mentioned problem, which is a program of moving picture encoding processing of, for a plurality of input image signals each having a different resolution, making a reference to an encoding result of one input image signal to encode the other input image signal, thereby to perform hierarchical encoding, is characterized in causing an information processing device to performing the processing of: encoding a first input image signal, generating first encoding data, and generating a decoded image signal, being a decoding result of the first encoding data; enlarging the decoded image signal so that it has a resolution identical to that of a second input image signal, and generating an enlarged decoded image signal; and subjecting the second input image signal to a motion compensation prediction to generate a second prediction error signal, subjecting the enlarged decoded image signal to a motion compensation prediction identical to the motion compensation prediction, to which the second input image signal has been subjected, to generate a first prediction error signal, and making a reference to the first prediction error signal to encode the second prediction error signal.

The sixth invention for solving the above-mentioned problem, which is a program of moving picture decoding processing of, for encoding data of a plurality of image signals each having a different resolution, making a reference to an decoding result of first encoding data to decode second encoding data, thereby to perform hierarchical decoding, is characterized in causing an information processing device to perform the processing of: decoding the first encoding data to generate a first decoded image signal; enlarging the first decoded image signal to generate an enlarged decoded image signal; and making a reference to motion information indicating a motion between frames of the image signal that specifies motion compensation decoding processing, subjecting the enlarged decoded image signal to a motion compensation prediction to generate a first prediction error signal, making a reference to the first prediction error signal to decode the second encoding data, and generating a second decoded image signal.

An outline of the present invention mentioned above will be explained below. FIG. 8 is a conceptual view signifying an operation of the moving picture encoding device in the present invention.

In FIG. 8, each of frames 1060, 1061, and 1062 is a frame that is included in the input image signal of a larger resolution, that is, the input image signal in a high hierarchy, and each of frames 1071 and 1072 is a frame that is included in a second prediction error signal 1001 that is obtained with the motion compensation prediction. Each of frames 2050, 2051, and 2052 is a frame that is included in the decoded image signal of a smaller resolution, that is, the decoded image signal in a low hierarchy, each of frames 2060, 2061 and 2062 is a frame that is included in the enlarged decoded image signal, and each of frames 2071 and 2072 is a frame that is included in a first prediction error signal 1001 that is obtained with the motion compensation prediction. Blocks 1081 and 1082 are regions that do not become an object of the motion compensation prediction in the frames 1071 and 1072, but are encoded as an intrablock, respectively. A block 2081 within the frame 2071 and a block 2083 within the frame 2061 are regions that correspond to the block 1081 within the frame 1071, respectively, and a block 2082 within the frame 2072 and a block 2084 within the frame 2062 are regions that correspond to the block 1082 within the frame 1072, respectively.

In the prior art, in encoding the signal of the frames 1071 and 1072, with the blocks 1081 and 1082, the prediction error signal is encoded by making a reference to the blocks 2083 and 2084, and with the region other than these blocks, it is encoded as it stands. In the latter encoding processing, notwithstanding the fact that there exists relativity with a result of having encoded the prediction error signal in the low-hierarchy input image signal, the former and the latter are independently encoded, respectively. That is, this encoding result has redundancy, which means that there is a room for enabling the encoding to be performed with higher efficiency.

On the other hand, in the moving picture encoding device in the present invention, in encoding the signal of the frames 1071 and 1072, with the blocks 1081 and 1082, its signal is encoded by making a reference to the blocks 2083 and 2084, and with the region other than these blocks, its signal is encoded by making a reference to the frames 2071 and 2072. The motion compensation processing for generating the frames 2071 and 2072 is not one that is carried out in the encoding processing for the low hierarchy, but is identical to one that is carried out in the encoding processing for the high hierarchy. For this, the frames 2071 and 2072 become approximate signals with a high precision of the frames 1071 and 1072, respectively. The present invention makes it possible to realize high-efficiency encoding having information, which is obtained from the decoding result of the low hierarchy, taken into consideration not only for the signal in the region for which the motion compensation prediction is not applied but also for the prediction error signal that is obtained with the motion compensation processing.

Effects of the Invention

In accordance with the present invention, the prediction error signal, which is obtained with the motion compensation processing in the high hierarchy, is subjected to the high-hierarchy motion compensation processing after enlarging the low-hierarchy decoded image signal, thereby to generate an approximate signal of the prediction error signal, and a reference hereto is made to encode the prediction error signal. The present invention makes it possible to encode the high-hierarchy prediction error signal with high efficiency as compared with the case of the prior art. As a result, it becomes possible to perform hierarchical encoding for the image signals hierarchically layered in plural with high efficiency.

BRIEF DESCRIPTION OF THE DRAWINGS

FIG. 2 is a block diagram illustrating a configuration that is one example of the texture conversion unit.
FIG. 3 is a block diagram illustrating a configuration that is one example of the texture encoding unit.
FIG. 4 is a block diagram illustrating a configuration that is one example of the texture inverse conversion unit.
FIG. 8 is a conceptual view signifying an operation of the moving picture encoding device in the present invention.
FIG. 9 is a general block configuration diagram of the information processing system having the moving picture encoding device in accordance with the present invention implemented.

Figure 1:
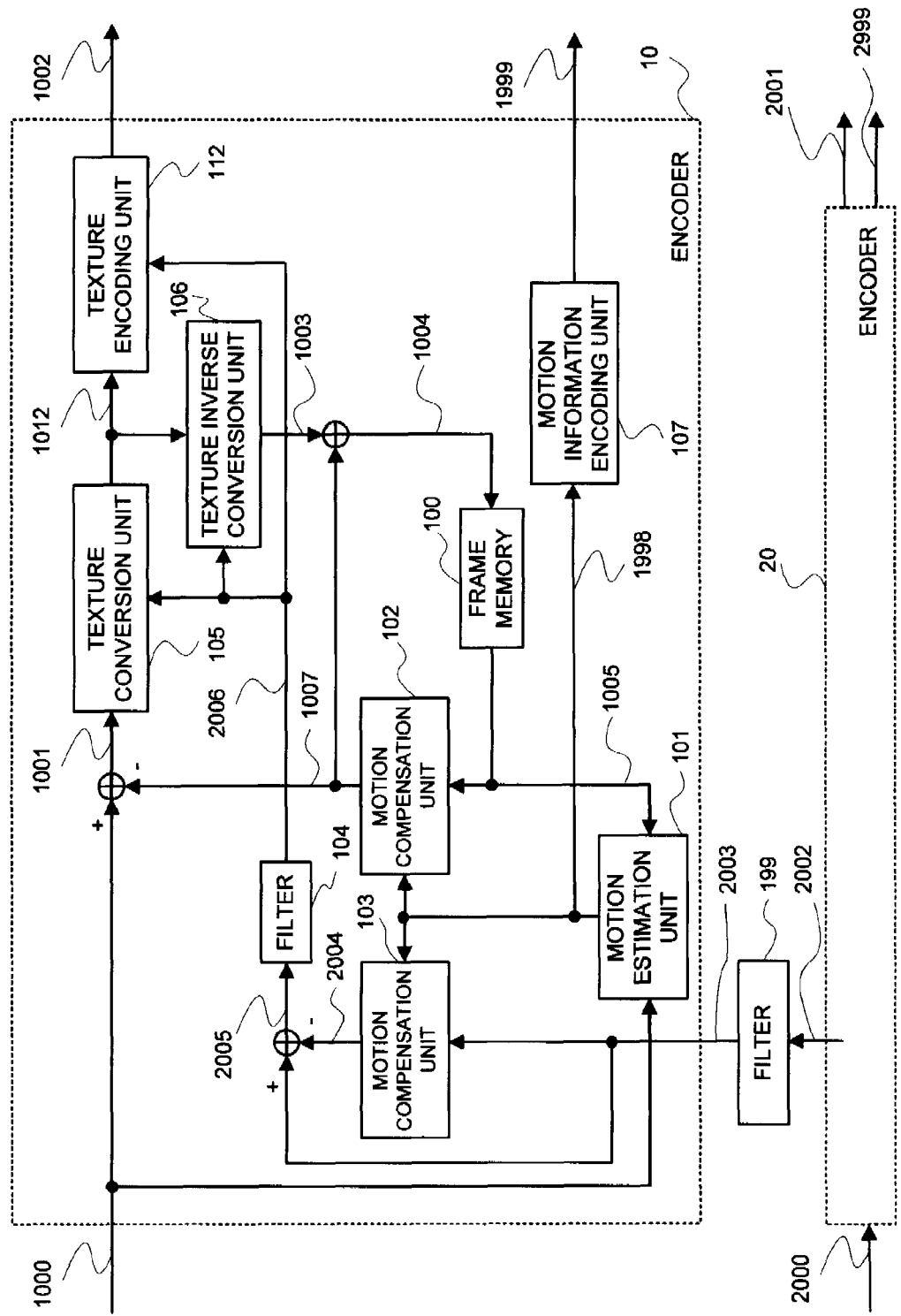
FIG. 1 is a block diagram illustrating a configuration of the moving picture encoding device that is one embodiment of the present invention.

DESCRIPTION OF NUMERALS 10, 11, and 20 encoders
12, and 22 decoders
100 frame memory
101 motion estimation unit
102 and 103 motion compensation units
104 and 199 filters
105 texture conversion unit
106 texture inverse conversion unit
107 motion information encoding unit
108 motion information decoding unit
110 conversion encoding unit
111 quantization unit
112 texture encoding unit
113 texture decoding unit
114 inverse quantization unit
115 inverse conversion encoding unit
122 zero region distribution information generation unit
120 zero region information generation unit
126 multiplexing unit
123 and 125 entropy encoding units
124 coefficient distribution information generation unit
125 non-zero coefficient encoding data
131 and 132 entropy decoding units
130 inverse multiplexing unit
133 coefficient information integration unit
1000 and 2000 input image signals
1001 and 2005 prediction error signals
1002 and 2001 texture information encoding data
1003 decoded prediction error signal
1004, 1005, and 2002 decoded image signals
1012 quantization conversion coefficient information
2006 processed prediction error signal
1007 and 2004 prediction signals
1998 motion information
1999 and 2999 motion information encoding data
2003 enlarged decoded image signal
1011 and 1014 conversion coefficient information 1022 and 1024 probability distribution information
1020 zero region information
1023 zero region information encoding data
1025 non-zero coefficient encoding data
1015 non-zero coefficient information
1060, 1061, 1062, 2050, 2051, 2052, 2060, 2061, 2062, 1071, 1072, 2071, and 2072 frames
1081, 1082, 2081, 2082, 2083, and 2084 blocks

BEST MODE FOR CARRYING OUT THE INVENTION

Next, the embodiment of the present invention will be explained in details by making a reference to the accompanied drawings. In FIG. 1, the moving picture encoding device that is one embodiment of the present invention is shown. The moving picture encoding device shown in FIG. 1 encodes two input image signals 1000 and 2000 each having a different resolution. An encoder 20 encodes the input image signal 2000 of a smaller resolution, and generates texture information encoding data 2001 and motion information encoding data 2999. Simultaneously therewith, the encoder 20 outputs a decoded image signal 2002, being a result of having decoded these items of the encoding data. A filter 199 enlarges the decoded image signal 2002 so that it has a resolution identical to that of the input image signal 1000 of a larger resolution, and outputs an enlarged decoded image signal 2003. An encoder 10 makes a reference to the enlarged decoded image signal 2003 to encode the input image signal 1000, and generates texture information encoding data 1002 and motion information encoding data 1999.

The encoder 20 is an encoder for encoding the image signal of a single resolution that is used conventionally, and for example, the moving picture encoder that is specified in the MPEG is employed for it. A configuration and an operation of the encoder 20 are not directly related with the characteristic of the present invention, and so its detailed explanation is omitted.

The encoder 10 is comprised of a frame memory 100, a motion estimation unit 101, motion compensation units 102 and 103, a filter 104, a texture conversion unit 105, a texture encoding unit 112, a texture inverse conversion unit 106, and a motion information encoding unit 107. Hereinafter, a configuration and an operation of the encoder 10 will be explained in details.

The frame memory 100 has the decoded image signal filed that is obtained by, after having encoded the input image signal 1000 input in the past, decoding it. The motion estimation unit 101 makes a reference to the input image signal 1000 and a decoded image signal 1005 filed in the frame memory 100, thereby to generate motion information 1998 signifying how each region within the input image signal 1000 behaves for the decoded image signal 1005. The motion compensation unit 102 makes a reference to the decoded image signal 1005, performs the motion compensation processing according to the motion information 1998, and generates a prediction signal 1007 of the input image signal 1000. Subtracting the prediction signal 1007 from the input image signal 1000 allows a prediction error signal 1001 to be obtained.

The motion compensation unit 103 makes a reference to the enlarged decoded image signal 2003 that corresponds to the decoded image signal 1005, performs the motion compensation processing based upon the motion information 1998, and generates a prediction signal 2004. Subtracting the prediction signal 2004 from the enlarged decoded image signal 2003 that corresponds to the input image signal 1000 allows a prediction error signal 2005 to be obtained.

The filter 104 processes the prediction error signal 2005 and generates a processed prediction error signal 2006. As this processing treatment, a noise removal of attenuating a strain generated due to the encoding, for example, a block strain, a sharpening treatment of steepening a change in a pixel value, or the like is thinkable.

The texture conversion unit 105 makes a reference to the processed prediction error signal 2006 to subject the prediction error signal 1001 to frequency conversion and quantization. The processed prediction error signal 2006 obtained by subjecting the enlarged decoded image signal 2003 to a motion compensation prediction becomes an approximate signal with a high precision of the prediction error signal 1001 obtained by subjecting the input image signal 1000 to a motion compensation prediction. Employing the approximate signal makes it possible to encode the prediction error signal 1001 with very high efficiency as compared with the case of independently encoding it. As one of the examples, encoding a difference between the prediction error signal 1001 and the processed prediction error signal 2006 is thinkable.

FIG. 2 is a block diagram illustrating a configuration, being another example of the texture conversion unit 105. A configuration and an operation of the texture conversion unit will be explained by employing FIG. 2. A conversion encoding unit 110 makes a reference to the processed prediction error signal 2006 to subject the prediction error signal 1001 to frequency conversion processing. As an example of making a reference to the processed prediction error signal 2006, being an approximate signal, to adaptably performing the frequency conversion processing, a Gabor transform or fractal encoding of expressing the signal with peculiar multiple bases superposed is listed. Putting restrictions on the base that is employed based upon the approximate signal enables the efficient encoding to be performed.

A quantization unit 111 makes a reference to the processed prediction error signal 2006 to quantize conversion coefficient information 1011 that the conversion encoding unit 110 outputs. As an example of making a reference to the processed prediction error signal 2006, being is an approximate signal, to adaptably perform the quantization, a weighting of the quantization is listed. Enlarging a quantization step at zero or in the neighborhood thereof based upon the distribution of the approximate signal, or coarsening a quantization step of the coefficient in the high-frequency bandwidth makes it possible to perform the quantization having a subjective image quality taken into consideration without encoding additional information. Or, in vector quantization, putting restrictions on the base of the quantization based upon the approximate signal makes it possible to perform efficient encoding. Additionally, the conversion encoding unit 110 and the quantization unit 111 may employ the conventional conversion encoding processing and the quantization processing in which a reference to the processed prediction error signal is not made, respectively. Further, a difference between the prediction error signal 1001 and the processed prediction error signal 2006 may be subjected to the frequency conversion processing and the quantization processing by making a reference to the processed prediction error signal.

Upon returning to FIG. 1, continuously, the operation of the moving picture encoding device will be explained. The texture encoding unit 112 makes a reference to the processed prediction error signal 2006, encodes quantization conversion coefficient information 1012 that the texture conversion unit 105 outputs, and generates texture information encoding data 1002. The motion information encoding unit 107 encodes the motion information 1998 to generate motion information encoding data. The texture inverse conversion unit 106 makes a reference to the processed prediction error signal 2006, subjects the quantization conversion coefficient information 1012 to inverse quantization and frequency inverse conversion, and generates a decoded prediction error signal 1003. Adding the decoded prediction error signal 1003 and the prediction signal 1007 allows a decoded image signal 1004 to be generated. The decoded image signal 1004, which is filed into the frame memory 100, is employed as a reference signal of the motion compensation at the time of encoding the other frames of the input image signal 1000.

FIG. 3 is a block diagram illustrating a configuration of one example in the texture encoding unit 112. An operation and a configuration of the texture encoding unit 112 will be explained by employing FIG. 3.

A zero region information generation unit 120 generates zero region information 1020 indicating whether all of the quantization conversion coefficient information 1012 is zero or not for each small block, being a encoding unit. A zero region distribution information generation unit 122 makes a reference to the processed prediction error signal 2006 to generate probability distribution information 1022 of the zero region information 1020. An entropy encoding unit 123 entropy-encodes the zero region information 1020 according to the probability distribution information 1022. In the corresponding small block, if a coefficient power of the processed prediction error signal 2006 is sufficiently small, the probability that all of the quantization conversion coefficient information 1012 that corresponds hereto is zero is high, and if a coefficient power of the processed prediction error signal 2006 is sufficiently large, the probability that all of the quantization conversion coefficient information 1012 that corresponds hereto is zero is low. Making a reference to the processed prediction error signal 2006 makes it possible to encode the zero region information 1020 with very high efficiency. On the other hand, for the small block in which at least one item of the zero region information 1020 is determined not to be zero, a coefficient distribution information generation unit 124 makes a reference to the processed prediction error signal 2006 to generate probability distribution information 1024 of the quantization conversion coefficient information 1012. An entropy encoding unit 125 makes a reference to the probability distribution information 1024 to entropy-encode the quantization conversion coefficient information 1012 of the corresponding small block. Estimating a provability distribution of the quantization conversion coefficient information 1012 from the processed prediction error signal 2006, being an approximate signal, to make encoding assignment according hereto enables the quantization conversion coefficient information 1012 to be encoded with very high efficiency. A multiplexing unit 126 multiplexes zero region encoding data 1023 that the entropy encoding unit 123 outputs, and non-zero coefficient encoding data 1025 that the entropy encoding unit 125 outputs, and generates texture information encoding data 1002.

Above, an explanation of the texture encoding unit 112 is finished. Additionally, the conventional entropy encoding processing in which a reference to the processed prediction error signal is not made may be employed.

FIG. 4 is a block diagram illustrating a configuration of the texture inverse conversion unit 106. A configuration and an operation of the texture inverse conversion unit 106 will be explained by employing FIG. 4.

An inverse quantization unit 114 makes a reference to the processed prediction error signal 2006 to inverse-quantize the quantization conversion coefficient information 1012, and generates conversion coefficient information 1014. An inverse conversion encoding unit 115 makes a reference to the processed prediction error signal 2006 to subject the conversion coefficient information 1014 to frequency inverse conversion, and generates a decoded prediction error signal 1003. The inverse quantization unit 114 and the inverse conversion encoding unit 115 correspond to the quantization unit 111 and the conversion encoding unit 110 in FIG. 2, respectively. In a case where the quantization unit 111 and the conversion encoding unit 110 employs the conventional method in which a reference to the processed prediction error signal 2006 is not made, respectively, the inverse quantization unit 114 and the inverse conversion encoding unit 115 also employs the conventional method similarly.

Above, an explanation of the moving picture encoding device, being an example of the present invention, is finished. Additionally, the case of independently encoding the prediction error signal 1001 and the case of making a reference to the processed prediction error signal 2006 to encode the prediction error signal 1001 may be switched over for each small block, being an encoding unit.

Figure 5:
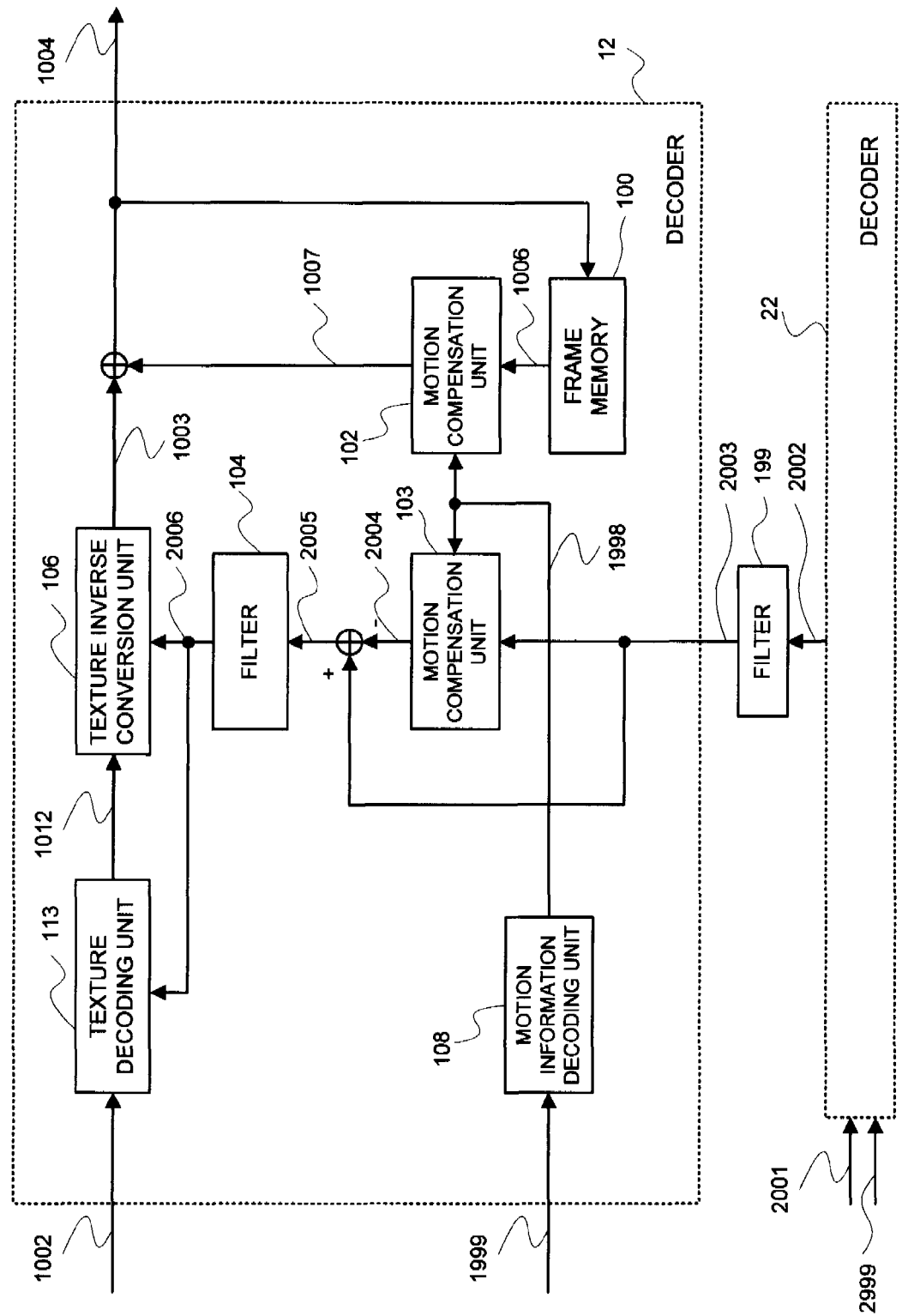
FIG. 5 is a block diagram illustrating a configuration of the moving picture decoding device that is one embodiment of the present invention.

Next, the moving picture decoding device in the present invention will be explained by employing the accompanied drawings. FIG. 5 shows the moving picture decoding device that is one embodiment of the present invention.

The moving picture decoding device shown in FIG. 5 decodes two items of encoding data obtained by encoding the image signals each having a different resolution. A decoder 22 decodes the texture information encoding data 2001 and the motion information encoding data 2999 corresponding to the image signal of a smaller resolution, and generates a decoded image signal 2002. A filter 199 enlarges the decoded image signal 2002 so that it has a resolution identical to that of the image signal of a larger resolutions and outputs an enlarged decoded image signal 2003. A decoder 12 makes a reference to the enlarged decoded image signal 2003, decodes the texture information encoding data 1002 and the motion information encoding data 1999, and generates a decoded image signal 1004.

The decoder 22, similarly to the encoder 20 in FIG. 1, is a decoder for decoding the image signal of a single resolution that is used conventionally, and for example, the moving picture decoder that is specified in the MPEG is employed for it. A configuration and an operation of the decoder 22 are not directly related with the characteristic of the present invention, and so its detailed explanation is omitted.

The decoder 12 is comprised of a frame memory 100, motion compensation units 102 and 103, a filter 104, a texture decoding unit 113, a texture inverse conversion unit 106, and a motion information decoding unit 108. Hereinafter, a configuration and an operation of the decoder 12 will be explained in details.

The motion information decoding unit 108 decodes the motion information encoding data 1999 to generate motion information 1998.

The motion compensation unit 103 making a reference to the enlarged decoded image signal 2003, performs the motion compensation processing based upon the motion information 1998, and generates a prediction signal 2004. Subtracting the prediction signal 2004 from the enlarged decoded image signal 2003 allows a prediction error signal 2005 to be obtained. The filter 104 processes the prediction error signal 2005, and generates a processed prediction error signal 2006. An operation of the motion compensation unit 103 and the filter 104 is identical to that of the motion compensation unit 103 and the filter 104 in FIG. 1.

The texture decoding unit 113 makes a reference to the processed prediction error signal 2006 to decode the texture information encoding data 1002, and generates quantization conversion coefficient information 1012.

The texture inverse conversion unit 106 makes a reference to the processed prediction error signal 2006 to subject the quantization conversion coefficient information 1012 to inverse quantization and frequency inverse conversion, and generates a decoded prediction error signal 1003.

The motion compensation unit 102 makes a reference to the past decoded image filed into the frame memory 100 to perform the motion compensation processing based upon the motion information 1998, and generates a prediction signal 1007. Adding the prediction signal 1007 and the decoded prediction error signal 1003 allows the decoded image signal 1004 to be generated. The decoded image signal 1004, which is filed into the frame memory 100, is employed as a reference signal for decoding the image next. The texture inverse conversion unit 106 and the motion compensation unit 102 are identical to the texture inverse conversion unit 106 and the motion compensation unit 102 in FIG. 2.

Figure 6:
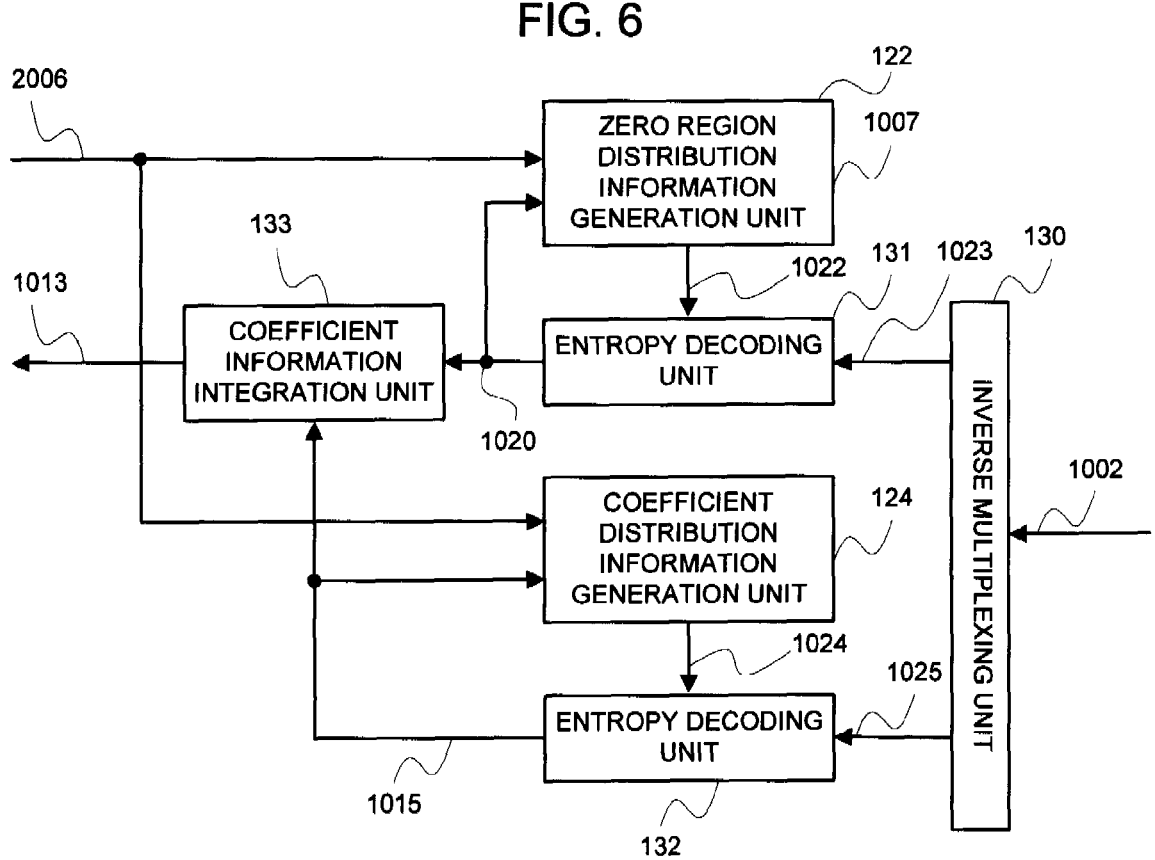
FIG. 6 is a block diagram illustrating a configuration that is one example of the texture decoding unit.
Figure 7:
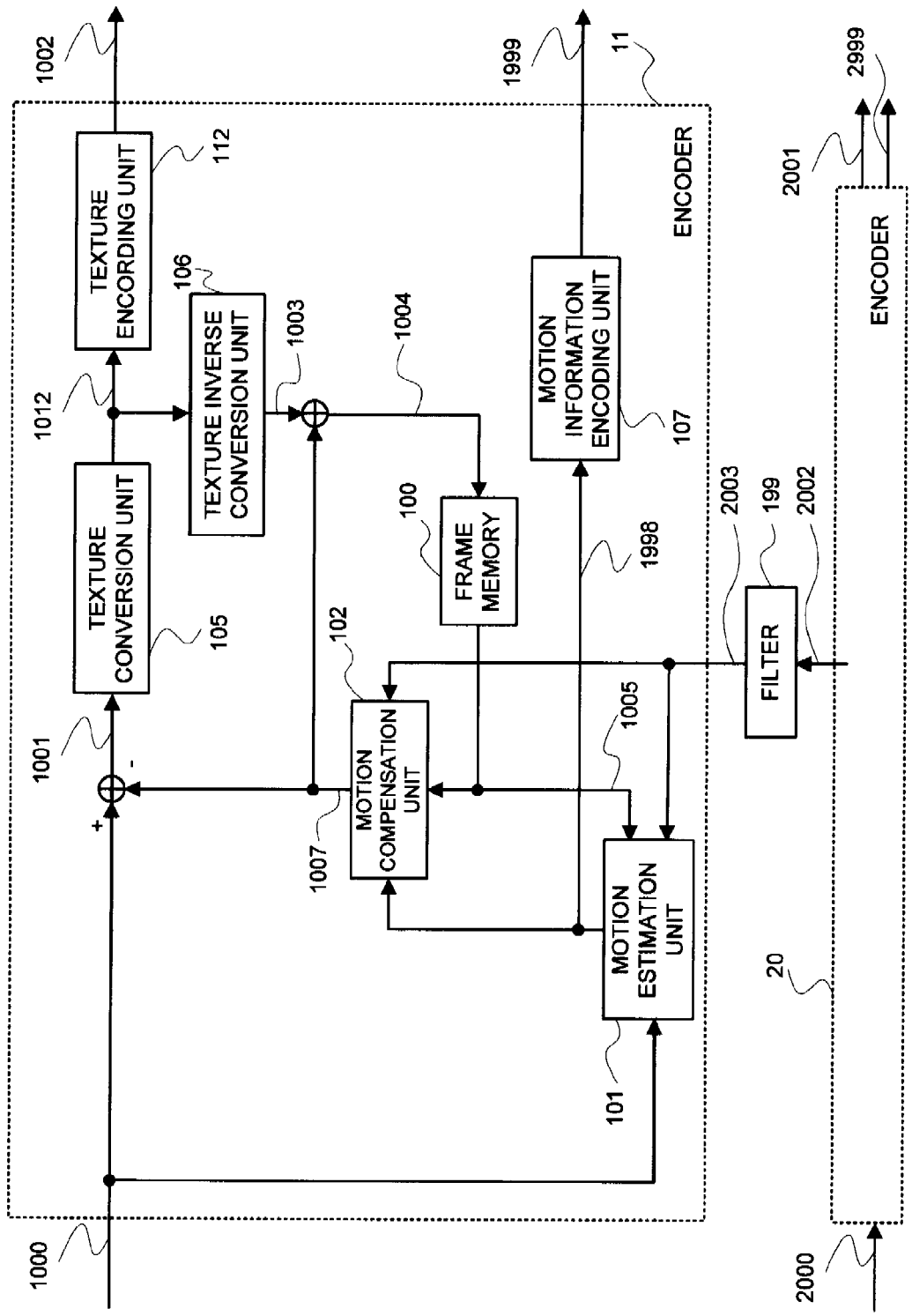
FIG. 7 is a block diagram illustrating a configuration of the moving picture encoding device, being a prior art.

FIG. 6 is a block diagram illustrating a configuration of the texture decoding unit 113. A configuration and an operation of the texture decoding unit 113 will be explained by employing FIG. 6.

An inverse multiplexing unit 130 inverse-multiplexes the texture information encoding data 1002, and generates zero region information encoding data 1023 and non-zero coefficient encoding data 1025. A zero region distribution information generation unit 122 makes a reference to the processed prediction error signal 2006 and the zero region information 1020 already decoded, and generates probability distribution information 1022 of the zero region. An entropy decoding unit 131 makes a reference to the probability distribution information 1022 to decode the zero region information encoding data 1023, and generates zero region information 1020. Further, A coefficient distribution information generation unit 124 makes a reference to the processed prediction error signal 2006 and the non-zero coefficient information 1015 already decoded, and generates probability distribution information 1024 of the non-zero coefficient. An entropy decoding unit 132 makes a reference to the probability distribution information 1024 to decode the non-zero coefficient encoding data 1025, and generates non-zero coefficient information 1015. A coefficient information integration unit 133 integrates the zero region information 1020 and the non-zero coefficient information 1015, and generates one frame portion of quantization conversion coefficient information 1013. The zero region distribution information generation unit 122 and the coefficient distribution information generation unit 124 are identical to the zero region distribution information generation unit 122 and the coefficient distribution information generation unit 124 in FIG. 3.

Above, an explanation of the moving picture decoding device, being an example of the present invention is finished. Additionally, similarly to the moving picture encoding device shown in FIG. 1, the case of independently decoding the prediction error signal 1001 and the case of making a reference to the processed prediction error signal 2006 to decode the prediction error signal 1001 may be switched over for each small block, being an encoding unit.

Further, in the present invention, after the enlarged decoded image signal 2003 is subjected to the motion compensation prediction to generate the prediction error signal 2005, the latter is processed by the filter 104, and is referenced by the texture conversion unit 105, the texture encoding unit 112, and the texture inverse conversion unit 106; however the prediction error signal 2005 may be employed directly as a reference signal without performing the processing by the filter 104.

In addition hereto, in this example, the configuration and the operation of the moving picture encoding device and the moving picture decoding device that realize the encoding processing and the decoding processing for the image signal of two-hierarchical different resolutions were explained; however the present invention is also applicable to the encoding processing and the decoding processing for the image signal of three-hierarchical or more different resolutions. In this case, the decoded image signal 1004 in the encoder 10 and decoder 12 is regarded as a decoded image signal in the low hierarchy to repeatedly actuate the high-hierarchical encoder 10 and decoder 12, thereby allowing these processing to be realized.

Further, in this example, the motion estimation was performed in the inside of the high-hierarchical encoder, and the input image signal and the low-hierarchical enlarged decoded image signal were subjected to the motion compensation prediction on the basis of the obtained motion information; however the characteristic of the present invention lies in a point of subjecting the input image signal and the low-hierarchical decoded image signal to the identical motion compensation prediction. This allows the case as well of inputting the motion information obtained with the motion estimation in the low-hierarchical encoder into the high-hierarchical encoder or decoder together with the enlarged decoded image signal to subject the high-hierarchical input image signal and the low-hierarchical enlarged decoded image signal to the motion compensation prediction based upon this motion information to be included in the applicable scope of thee present invention.

In addition hereto, the characteristic of the present invention lies in a point of subjecting the low-hierarchical decoded image signal to the motion compensation prediction identical to that of the high hierarchy, making a reference to the obtained prediction error signal, and subjecting the prediction error signal in the high hierarchy to the processing such as quantization, conversion encoding, and entropy encoding. This allows the case as well of converting the motion information, which is employed for the motion compensation prediction in the high hierarchy, according to the high-hierarchical and low-hierarchical resolutions, subjecting the low-hierarchical decoded image signal to the motion compensation prediction based upon the converted motion information, and making a reference to the obtained prediction error signal to subject the high-hierarchical prediction error signal to the processing such as quantization, conversion encoding, and entropy encoding to be included in the applicable scope of thee present invention.

As apparent from the above explanation, it is possible to configure the moving picture encoding device and the moving picture decoding device in accordance with the present invention of hardware; however it is also possible to realize them with a computer program.

FIG. 9 is a general block configuration diagram of the information processing system having the moving picture encoding device in accordance with the present invention implemented.

The information processing system shown in FIG. 9 is comprised of a processor 300, a program memory 301, and record mediums 302 and 303. The record mediums 302 and 303 may be a separate record medium, and may be a record region that is comprised of an identical record medium, respectively. As the record medium, magnetic record mediums such as a RAM and a hard disc can be employed.

The program memory 301 has a program filed that causes the processor 300 to perform the processing of each unit of the foregoing encoder 10, and the processor 300, which operates according to this program, files the result into record mediums 302 and 303.

Likewise, it is possible to realize the moving picture decoding device as well in accordance with the present invention with the computer program. In this case, the program memory 301 has a program filed that causes the processor 300 to perform the processing of each unit of the foregoing decoder 12, and the processor 300, which operates according to this program, files the result into record mediums 302 and 303.

As an example of putting the present invention to practical use, an application to a moving picture sequence delivery system for delivering a single moving picture sequence to terminals each having a different reproduction environment or transmission environments, or to the terminal for receiving data from this delivery system to reproduce the moving picture is thinkable. The moving picture sequence delivery system having the technology of the present invention makes it possible to remarkably reduce a processing cost of the encoding, a accumulating cost, and a cost for the processing prior to delivery notwithstanding delivery of the moving picture having an identical image quality as compared with the case of independently preparing the encoding data.

Further, a user of the reproduction terminal having the technology of the present invention can enjoy the delivery service, which realizes the preferred moving picture delivery at an inexpensive cost, at any time also in the different environments.

The invention claimed is:

1. A moving picture encoding device for, for a plurality of input image signals each having a different resolution, making a reference to an encoding result of one input image signal to encode the other input image signal, thereby to perform hierarchical encoding, characterized in:
   including:
   first image encoding means for encoding a first input image signal, generating first encoding data, and generating a decoded image signal, being a decoding result of said first encoding data;
   a filter for enlarging said decoded image signal so that it has a resolution identical to that of a second input image signal, and generating an enlarged decoded image signal;
   second image encoding means for making a reference to said enlarged decoded image signal to encode said second input image signal, and generating second encoding data; and
   that said second image encoding means subjects said second input image signal to a motion compensation prediction to generate a second prediction signal, subtracts said second prediction signal from said second input image signal to generate a second prediction error signal, subjects said enlarged decoded image signal to a motion compensation prediction identical to the motion compensation prediction, to which said second input image signal has been subjected, to generate a first prediction signal, subtracts said first prediction signal from said enlarged decoded image signal to generate a first prediction error signal, and adaptably regulates encoding processing of said second prediction error signal based upon said first prediction error signal.

2. A moving picture encoding device according to claim 1, wherein the second image encoding means makes a reference to said first prediction error signal and adaptably performs frequency conversion processing for said second prediction error signal.

3. A moving picture encoding device according to claim 1, wherein the second image encoding means makes a reference to said first prediction error signal and adaptably performs quantization processing for said second prediction error signal.

4. A moving picture encoding device according to claim 1, wherein the second image encoding means generates probability distribution information based upon said first prediction error signal and performs entropy encoding processing for said second prediction error signal according to said probability distribution information.

5. A moving picture decoding device for, for encoding data of a plurality of input image signals each having a different resolution, making a reference to a decoding result of first encoding data to decode second encoding data, thereby to perform hierarchical decoding processing, characterized in:
   including:
   first image decoding means for decoding the first encoding data to generate a first decoded image signal;
   a filter for enlarging said first decoded image signal to generate an enlarged decoded image signal; and
   second image decoding means for making a reference to said enlarged decoded image signal to decode the second encoding data, and generating a second decoded image signal; and
   making a reference to motion information indicating a motion between frames of the image signal that specifies motion compensation decoding processing in said second image decoding means, subjecting said enlarged decoded image signal to a motion compensation prediction to generate a first prediction signal, subtracting said first prediction signal from said enlarged decoded image signal to generate a first prediction error signal, and adaptably regulating decoding processing of a decoded prediction error signal for a decoded image of said second encoding data based upon said first prediction error signal.

6. A moving picture encoding method of, for a plurality of input image signals each having a different resolution, making a reference to an encoding result of one input image signal to encode the other input image signal, thereby to perform hierarchical encoding, characterized in including the steps of:
   encoding a first input image signal, generating first encoding data, and generating a decoded image signal, being a decoding result of said first encoding data;
   enlarging said decoded image signal so that it has a resolution identical to that of a second input image signal, and generating an enlarged decoded image signal; and
   subjecting said second input image signal to a motion compensation prediction to generate a second prediction signal, subtracting said second prediction signal from said second input image to generate a second prediction error signal, subjecting said enlarged decoded image signal to a motion compensation prediction identical to the motion compensation prediction, to which said second input image signal has been subjected, to generate a first prediction signal, subtracting said first prediction signal from said enlarged decoded image signal to generate a first prediction error signal, and adaptably regulating encoding processing of said second prediction error signal based upon said first prediction error signal.

7. A moving picture decoding method of, for encoding data of a plurality of image signals each having a different resolution, making a reference to an decoding result of first encoding data to decode second encoding data, thereby to perform hierarchical decoding processing, characterized in including the steps of:

decoding the first encoding data to generate a first decoded image signal;

enlarging said first decoded image signal to generate an enlarged decoded image signal; and making a reference to motion information indicating a motion between frames of the image signal that specifies motion compensation decoding processing in generation of a second decoded image signal, said motion information being included in said second encoding data, subjecting said enlarged decoded image signal to a motion compensation prediction to generate a first prediction signal, subtracting said first prediction signal from said enlarged decoded image signal to generate a first prediction error signal, and adaptably regulating decoding processing of a decoded prediction error signal for a decoded image of said second encoding data based upon said first prediction error signal.

8. A non-transitory computer readable storage medium storing a program of moving picture encoding processing of, for a plurality of input image signals each having a different resolution, making a reference to an encoding result of one input image signal to encode the other input image signal, thereby to perform hierarchical encoding, characterized in causing an information processing device to performing the processing of:

encoding a first input image signal, generating first encoding data, and generating a decoded image signal, being a decoding result of said first encoding data;

enlarging said decoded image signal so that it has a resolution identical to that of a second input image signal, and generating an enlarged decoded image signal; and subjecting said second input image signal to a motion compensation prediction to generate a second prediction signal, subtracting said second prediction signal from said second input image signal to generate a second prediction error signal, subjecting said enlarged decoded image signal to a motion compensation prediction identical to the motion compensation prediction, to which said second input image signal has been subjected, to generate a first prediction signal, subtracting said first prediction signal from said enlarged decoded image signal to generate a first prediction error signal, and adaptably regulating encoding processing of said second prediction error signal based upon said first prediction error signal.

9. A non-transitory computer readable storage medium storing a program of moving picture decoding processing of, for encoding data of a plurality of image signals each having a different resolution, making a reference to an decoding result of first encoding data to decode second encoding data, thereby to perform hierarchical decoding, characterized in causing an information processing device to perform the processing of:

decoding the first encoding data to generate a first decoded image signal;

enlarging said first decoded image signal to generate an enlarged decoded image signal; and making a reference to motion information indicating a motion between frames of the image signal that specifies motion compensation decoding processing in generation of a second decoded image signal, said motion information being included in said second encoding data, subjecting said enlarged decoded image signal to a motion compensation prediction to generate a first prediction signal, subtracting said first prediction signal from said enlarged decoded image signal to generate a first prediction error signal, and adaptably regulating decoding processing of a decoded prediction error signal for a decoded image of said second encoding data based upon said first prediction error signal.

\* \* \* \* \*